(12) United States Patent  
Jin et al.

(10) Patent No.: US 11,772,506 B2
(45) Date of Patent: Oct. 3, 2023

(54) CONVERTER-SEPARATED ELECTRIC VEHICLE CHARGING SYSTEM, AND ELECTRIC VEHICLE CHARGING APPARATUS INSTALLED ON UTILITY POLE

(71) Applicant: KOREA ELECTRIC POWER CORPORATION, Naju-si (KR)

(72) Inventors: Bong-Kun Jin, Naju-si (KR); Seong-Man Kim, Naju-si (KR); Do-Jin You, Naju-si (KR)

(73) Assignee: KOREA ELECTRIC POWER CORPORATION, Naju-si (KR)

( * ) Notice: Subject to any disclaimer, the term of this patent is extended or adjusted under 35 U.S.C. 154(b) by 961 days.

(21) Appl. No.: 16/500,807

(22) PCT Filed: Jun. 12, 2017

(86) PCT No.: PCT/KR2017/006074
§ 371 (c)(1),
(2) Date: Oct. 3, 2019

(87) PCT Pub. No.: WO2018/186528
PCT Pub. Date: Oct. 11, 2018

(65) Prior Publication Data
US 2022/0305929 A1    Sep. 29, 2022

(30) Foreign Application Priority Data

Apr. 5, 2017    (KR) .................. 10-2017-0044095

(51) Int. Cl.
*B60L 53/31*    (2019.01)
*B60L 53/18*    (2019.01)
*H02J 7/00*    (2006.01)

(52) U.S. Cl.
CPC .............. *B60L 53/31* (2019.02); *B60L 53/18* (2019.02); *H02J 7/0042* (2013.01); *H02J 2207/20* (2020.01)

(58) Field of Classification Search
CPC ........ B60L 53/31; B60L 53/18; H02J 7/0042; H02J 2207/20
(Continued)

(56) References Cited

U.S. PATENT DOCUMENTS

2010/0017249 A1    1/2010    Fincham et al.
2010/0106631 A1*   4/2010    Kurayama .............. B60L 53/14
                                                              320/109

(Continued)

FOREIGN PATENT DOCUMENTS

CN    101627518 A    1/2010
CN    102906959 A    1/2013
(Continued)

OTHER PUBLICATIONS

Communication from Japanese Intellectual Property Office for Office Action dated Nov. 17, 2020 of the Japanese Patent Application No. 2019-554562, which corresponds to the present application.

(Continued)

*Primary Examiner* — Nathaniel R Pelton
(74) *Attorney, Agent, or Firm* — Foundation Law Group, LLP (57) ABSTRACT

A system for charging an electric vehicle according to an exemplary embodiment of the present disclosure may include a transformer connected to a distribution line, a converter converting power converted by the transformer into charging power and a charging apparatus separated from the converter and installed on a utility pole to receive (Continued)

the charging power from the converter and supply the charging power to the electric vehicle.

4 Claims, 10 Drawing Sheets

(58) Field of Classification Search
USPC .......................................................... 320/109
See application file for complete search history.

(56) References Cited

U.S. PATENT DOCUMENTS

| | | |
|---|---|---|
| 2013/0015707 A1 | 1/2013 | Redmann |
| 2013/0069592 A1* | 3/2013 | Bouman ................. B60L 53/53 |
| | | 320/109 |
| 2013/0241479 A1* | 9/2013 | Wright, Jr. ............... H02H 5/10 |
| | | 141/94 |
| 2014/0167697 A1 | 6/2014 | Stempin |
| 2014/0320084 A1* | 10/2014 | Masuda ................. B60L 53/11 |
| | | 320/109 |
| 2015/0116936 A1 | 4/2015 | Zengerle et al. |
| 2016/0059716 A1* | 3/2016 | Gale .................... B60L 53/305 |
| | | 320/109 |
| 2016/0375781 A1 | 12/2016 | Herke et al. |
| 2016/0378781 A1* | 12/2016 | Jerrard-Dunne .... G06F 16/1734 |
| | | 707/692 |
| 2017/0174090 A1* | 6/2017 | Lakamp .................... H02J 7/35 |

FOREIGN PATENT DOCUMENTS

| | | |
|---|---|---|
| CN | 104136265 A | 11/2014 |
| CN | 205661316 U | 10/2016 |
| JP | H1014014 A | 1/1998 |
| JP | 2008-199752 A | 8/2008 |
| JP | 2009065785 A | 3/2009 |
| JP | 2012-200084 A | 10/2012 |
| JP | 2013529052 A | 7/2013 |
| JP | 2013-150427 A | 8/2013 |
| JP | 2014-128181 A | 7/2014 |
| KR | 20-2011-0007572 U | 8/2011 |
| KR | 10-2012-0139558 A | 12/2012 |

OTHER PUBLICATIONS

Communication from Chinese Intellectual Property Office for Office Action dated Aug. 18, 2022 of the Chinese Patent Application No. 201780089408.2, which corresponds to the present application.

* cited by examiner

CONVERTER-SEPARATED ELECTRIC VEHICLE CHARGING SYSTEM, AND ELECTRIC VEHICLE CHARGING APPARATUS INSTALLED ON UTILITY POLE

CROSS REFERENCE TO RELATED PATENT APPLICATIONS

This application claims the benefit under 35 U.S.C. Section 371, of PCT International Application No. PCT/KR2017/006074 filed on Jun. 12, 2017, which claimed priority to Korean Patent Application No. 10-2017-0044095 filed on Apr. 5, 2017, the disclosures of which are hereby incorporated by the references.

TECHNICAL FIELD

The present disclosure relates to a converter-separated electric vehicle-charging system and an electric vehicle-charging apparatus installed on a utility pole.

BACKGROUND ART

Recently, there have been active research and development worldwide, into the use of new types of renewable energy and eco-friendly transportation due to serious problems, such as depletion of fossil fuels and environmental pollution caused by excessive use of fossil fuels. In this regard, electric vehicles (EV) are attracting attention as eco-friendly transportation. The proliferation of EV-charge infrastructure is essential for the spread of EVs.

DISCLOSURE

Technical Problem

The present disclosure provides a converter-separated EV-charging system and an EV-charging apparatus installed on a utility pole, enabling the spread of EV-charge infrastructure by separating a relatively large and heavy converter from a charging apparatus and thus providing an environment facilitating easy installation of an EV-charging apparatus on a utility pole.

Technical Solution

The EV-charging system according to an exemplary embodiment of the present disclosure may include a transformer connected to a distribution line; a converter converting power converted by the transformer into charging power; and a charging apparatus separated from the converter and installed on a utility pole to receive the charging power from the converter and supply the charging power to the electric vehicle.

For example, the converter may be installed in a position higher than a position in which the charging apparatus is installed on the utility pole or a second utility pole.

For example, the transformer may be installed on the second utility pole, and the converter may be installed on the second utility pole.

For example, the EV-charging system may further include an underground cable for electrically connecting the converter and the charging apparatus through underground, where the transformer may be installed on the second utility pole and the converters may be installed to be spaced apart from the utility pole or the second utility pole.

For example, the converter may be installed underground.

For example, the EV-charging system may further include a second converter converting power converted by the converter to fast charging power and supplying the fast charging power to the charging apparatus.

The EV-charging apparatus installed on the utility pole according to an exemplary embodiment of the present disclosure may include an enclosure comprising a first port configured to supply charging power to an electric vehicle and a second port configured to receive the charging power from an external converter converting power converted by a transformer connected to a distribution line to the charging power, and installed on a utility pole; and a blocking unit switching opening or closing a path between the first port and the second port.

Advantageous Effects

The converter-separated EV-charging system and EV-charging apparatus installed on a utility pole according to an exemplary embodiment of the present disclosure provide an environment facilitating easy installation of the EV-charging apparatus on the utility pole, thereby spreading the EV-charge infrastructure.

The converter-separated EV-charging system and EV-charging apparatus installed on a utility pole according to an exemplary embodiment can have a stable structure while stably supporting various charging modes, thereby employing a structure facilitating expansion of the converter.

MODE FOR INVENTION

Hereinafter, example embodiments of the present disclosure will be described with reference to the accompanying drawings. It is to be understood that the various embodiments of the invention, although different, are not necessarily mutually exclusive. For example, structures, shapes, and features described in the example embodiments may be implemented in another example embodiment without departing from the spirit and scope of the present disclosure. Further, modifications of positions or arrangements of elements in the example embodiments may be made without departing from the spirit and scope of the present disclosure. Therefore, the following detailed description is, therefore, not to be taken in a limiting sense, and the scope of the present invention is limited only by appended claims, appropriately interpreted, along with the full range of equivalents to which the claims are entitled. In the drawings, the same reference numerals may refer to the same or similar function in various aspects.

Hereinbelow, the exemplary embodiments will be described in more detail with reference to the accompanying drawings so as that those skilled in the art can easily practice the present disclosure.

Figure 1:
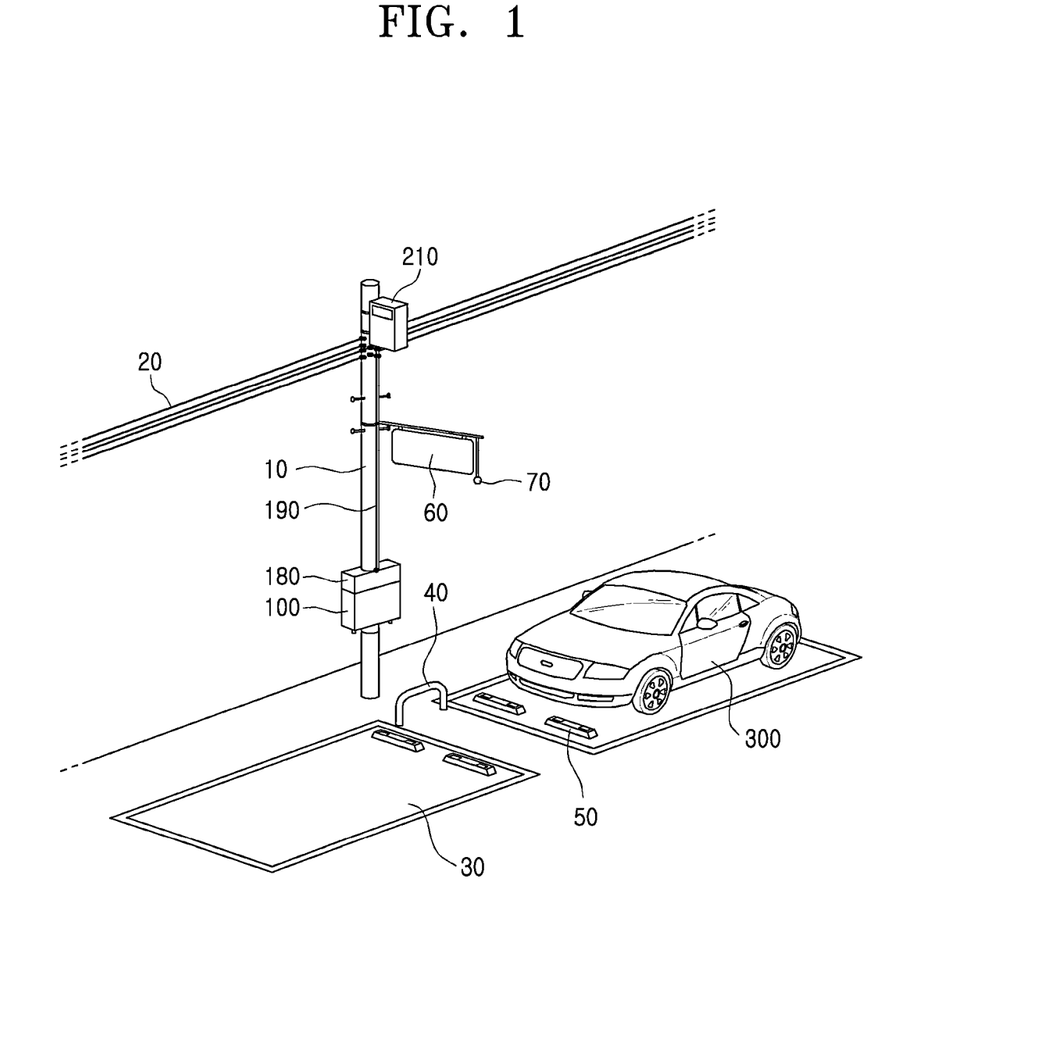
FIG. 1 is a diagram illustrating the EV-charging system according to an exemplary embodiment of the present disclosure.

FIG. 1 is a diagram illustrating the EV-charging system according to an exemplary embodiment.

Referring to FIG. 1, the EV-charging system according to an exemplary embodiment may include an EV-charging apparatus 100, an intelligent distribution box 180, a data processing device 210, a transformer (not illustrated), and may be provided in an EV-charging station including a unity pole 10, a distribution line 20, a parking space 30, a bollard for preventing a vehicle crash 40, a vehicle stopper 50, a charging station sign 60 and a visual device 70. The utility pole is not limited to a telegraph pole; it refers to a pole on which the EV-charging apparatus 100 can hang and capable of providing an environment in which electric power supplied from the distribution line is delivered to the EV-charging apparatus 100.

The EV-charging apparatus 100 may be configured to be installed on the utility pole 10, provide power from the transformer and charge the EV 300. For example, the EV-charging apparatus is connected to a distribution line 20 through a power cable 190, thereby receiving power.

The transformer, linked to the distribution line 20, can transform high-voltage power into low-voltage power. For example, the transformer may be a pole transformer installed on the utility pole 10, a second utility pole (not illustrated) or a ground transformer installed on the street or sidewalk.

The data processing device 210 can collect and treat current, voltage or power data of the transformer to produce load amount information. The load amount information may b defined as a total amount of power transformed by the transformer. When the load amount is large, a lifespan of the transformer may decrease, damage frequency of the transformer may increase, and the power supplied to the EV-charging apparatus 100 from the transformer may be unstable.

The intelligent distribution box 180 receives the loading amount information, and may inactivate the EV-charging apparatus 100 when a load amount thereof corresponding to the load amount information is higher than a standard load amount. The inactivated EV-charging apparatus 100 may temporarily pause the charging.

Accordingly, the lifespan of the transformer may be extended, and the damage frequency may decrease while the power provided to the EV-charging apparatus 100 may be stabilized.

Meanwhile, the intelligent distribution box 180 and the EV-charging apparatus 100 may be integrated according to a design thereof. That is, when an EV-charging system does not include the intelligent distribution box 180, the EV-charging apparatus 100 may take over roles of the intelligent distribution box.

Meanwhile, the power transformed by the transformer may further be transformed by a converter, which will be described, before being provided to the EV 300. According to a design thereof, the converter may be included in the EV-charging apparatus 100 or may be separated therefrom as described below.

Figure 2:
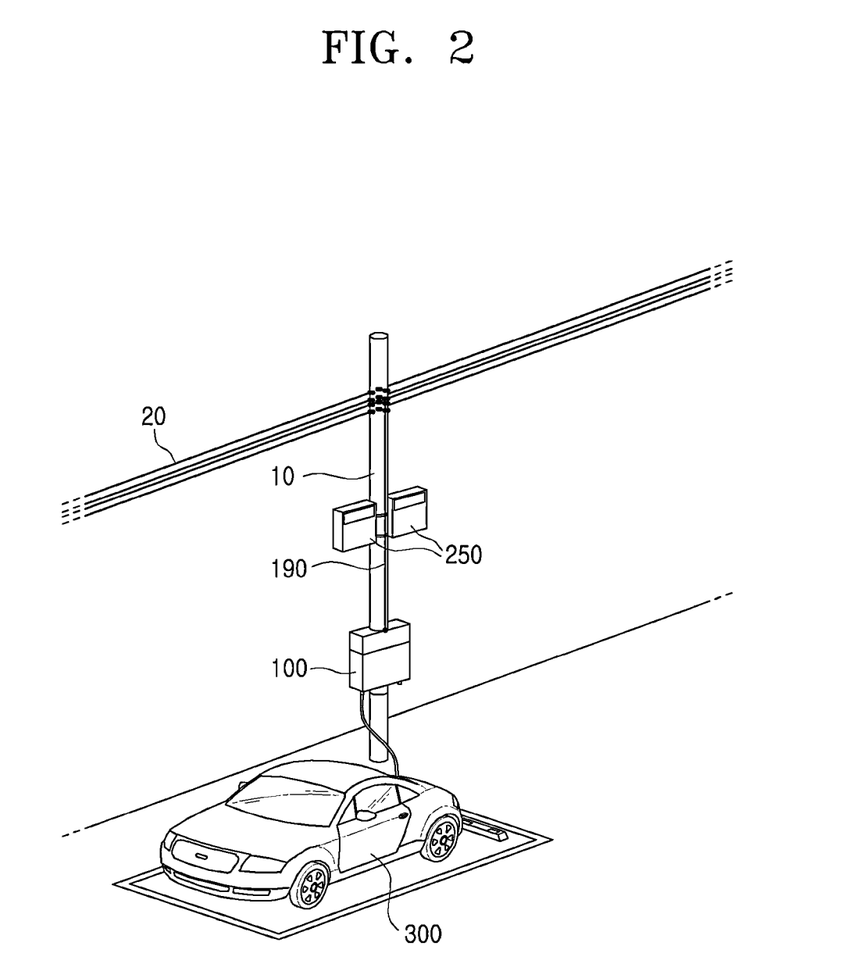
FIG. 2 exemplifies an arrangement of the converter of the EV-charging system according to an exemplary embodiment.

FIG. 2 is a diagram exemplifying an arrangement of the converter of the EV-charging system according to an exemplary embodiment.

Referring to FIG. 2, the converter 250 converting the power transformed by the transformer linked to the distribution line 20 into power for charging may be separated from the EV-charging apparatus 100 and installed on the utility pole.

Conventionally, the converter 250 may be relatively heavier or larger than the EV-charging apparatus 100. Therefore, the EV-charging apparatus 100, the converter from which is separated, may be miniaturized, and can have durability so as to withstand wind pressure or external shocks, even when installed on the utility pole 10.

Such EV-charging apparatus 100 having improved durability may be easily installed on various types or ages of utility poles. Accordingly, the EV-charging system and the EV-charging apparatus according to an exemplary embodiment provide an environment enabling easy installation on a utility pole, thereby contributing to the spread of the EV-charge infrastructure.

For example, the converter 250 may be installed in a position higher than a position in which the EV-charging apparatus 100 is installed on the utility pole 10. Accordingly, the utility pole 10 may stably find a center of gravity even though the EV-charging apparatus 100 and the converter 250 are installed.

Meanwhile, two or more converters 250 may be implemented so that various charging modes can be stably supported. When two or more converters 250 are implemented, the EV-charging apparatus 100 can stably employ various charging modes and can disperse an increasing weight or volume of the converter 250.

For example, the converter 250 may include a first converter which converts power transformed by the transformer into slow charging power and supplies the slow charging power to the EV-charging apparatus 100 and a second converter converting power transformed by the transformer into quick charging power and supplies the quick charging power to the EV-charging apparatus 100.

In this regard, the converter 250 may stably support various charging modes for the EV-charging apparatus 100 while stably being installed on the utility pole.

Figure 3:
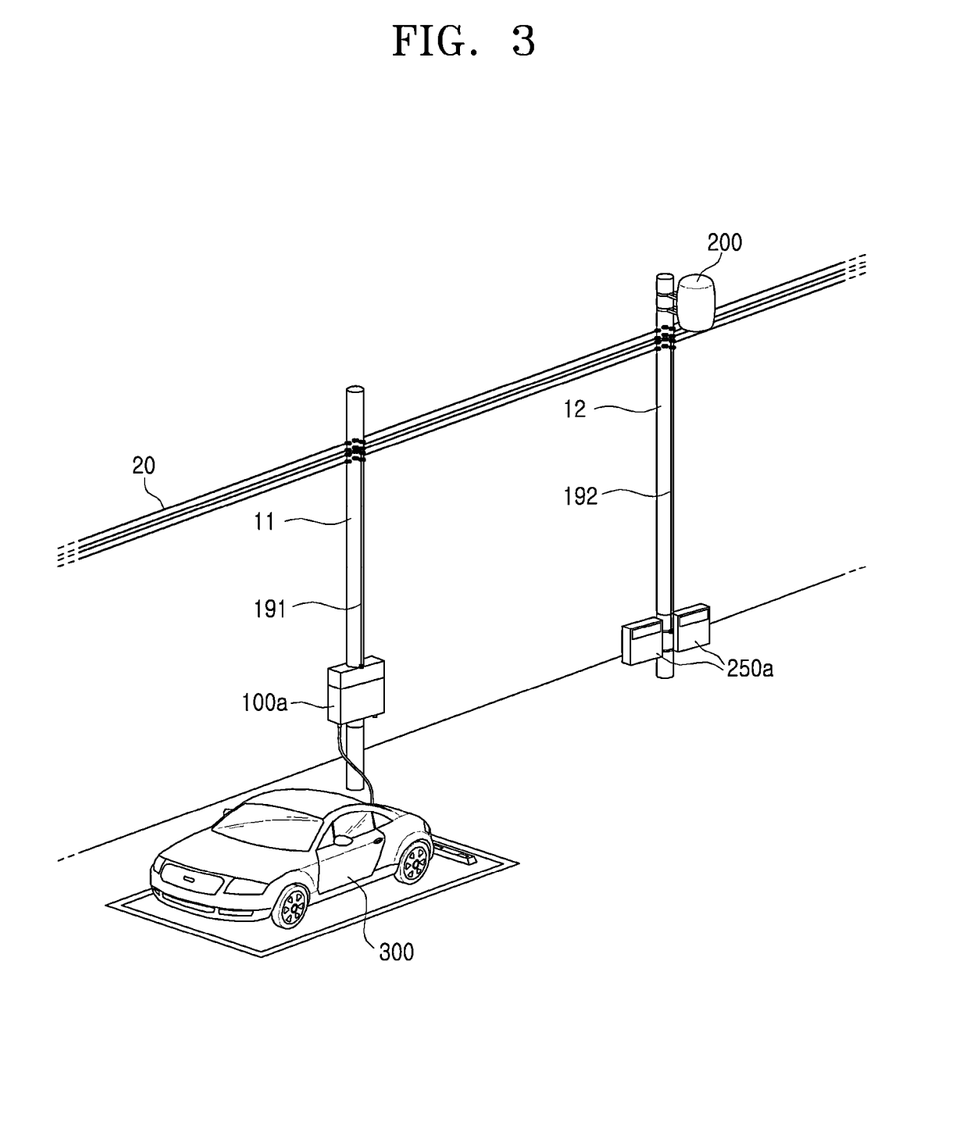
FIG. 3 exemplifies an arrangement of the converter of the EV-charging system according to an exemplary embodiment.

FIG. 3 is a diagram exemplifying an arrangement of the converter of the EV-charging system according to an exemplary embodiment.

Referring to FIG. 3, the converter 250a and the transformer 200 linked to a distribution line may be installed on the second utility pole 12.

In other words, the converter 250a may be installed on the second utility pole 12, which is different from a first utility pole 11 on which an EV-charging apparatus 100a is installed. In this regard, the converter 250a may be installed so as to be in contact with the ground or at a lower position of the pole 12, and thus can have a stable structure.

The power transformed by the transformer 200 linked to a distribution line may be provided to the converter 250a through a second power cable 192.

The charging power transformed by the converter 250a may be supplied to the EV-charging apparatus 100a through the distribution line 20 and the first power cable 191 or through an underground cable (not illustrated).

Figure 4:
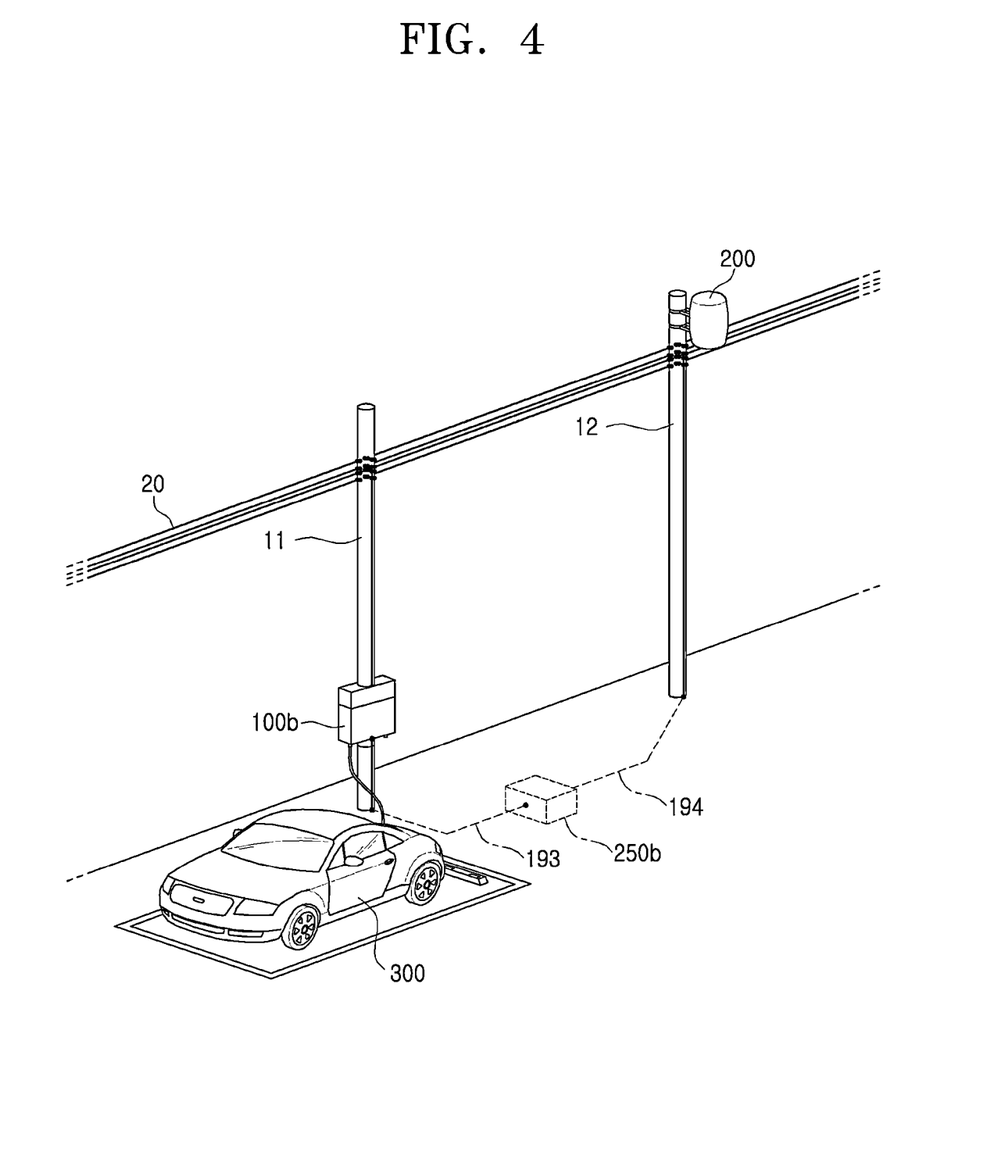
FIG. 4 exemplifies an arrangement of the converter of the EV-charging system according to an exemplary embodiment.

FIG. 4 is a diagram exemplifying an arrangement of the converter of the EV-charging system according to an exemplary embodiment.

Referring to FIG. 4, the converter 250b may be spaced apart from the first and second utility poles 11 and 12. In this regard, the converter 250b may have a structure facilitating expansion thereof.

Additionally, the converter 250b may be electrically connected to a first underground cable 193 and a second underground cable 194 and may be installed underground. Accordingly, the converter 250b can prevent damage caused by an external shock in advance.

Meanwhile, the first underground cable 193 may be electrically connected to the EV-charging apparatus 100b, while the second underground cable 194 may be electrically connected to the transformer 200 linked to the distribution line. That is, the EV-charging apparatus according to an exemplary embodiment may be provided with power, not only through a distribution line linked to the utility pole, but also underground.

Figure 5:
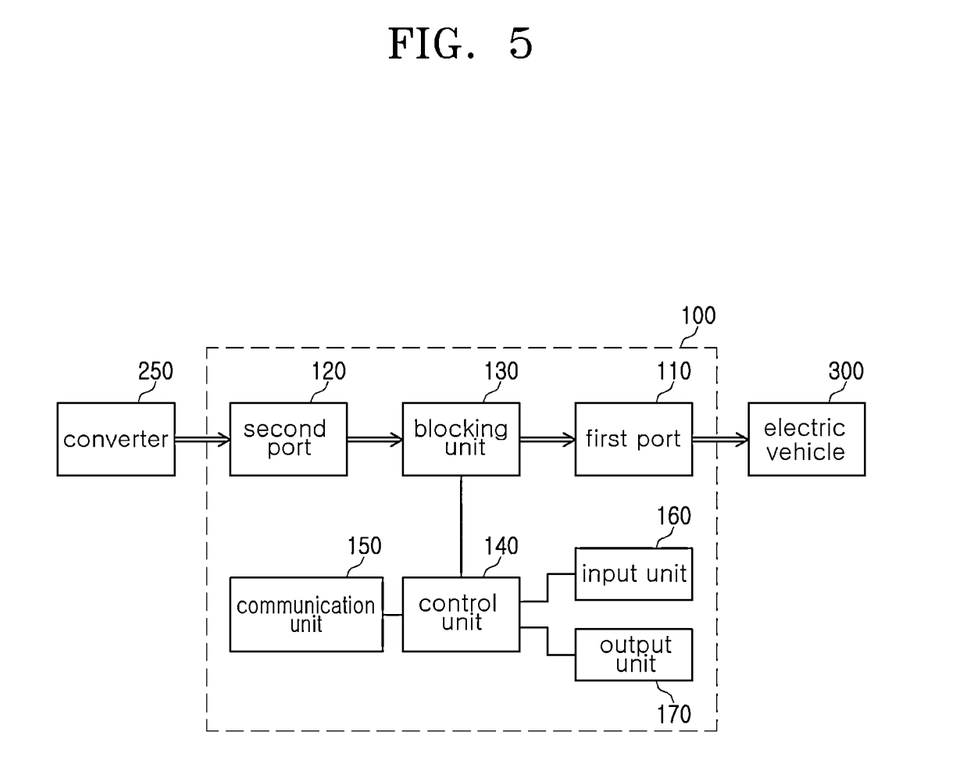
FIG. 5 is a block diagram illustrating the EV-charging apparatus installed on the utility pole according to an exemplary embodiment.

FIG. 5 is a block diagram illustrating the EV-charging apparatus installed on the utility pole according to an exemplary embodiment.

Referring to FIG. 5, the EV-charging apparatus 100 according to an exemplary embodiment may include at least some of a first port 110, a second port 120, a blocking unit 130, a control unit 140, a communication unit 150, an input unit 160 and an output unit 170.

The first port 110 may be configured to provide charging power to an EV 300.

The second port 120 may be configured to provide the charging power converted by the converter.

For example, the first and second ports 110 and 120 may have a structure in which the first and second ports 110 and 120 are connected to a power cable to supply charging power through wires or may be implemented as a coil so as to wirelessly provide the charging power at a short distance.

The blocking unit 130 may switch opening and closing a path between the first and second ports 110 and 120. The charging of the EV 300 of the EV-charging apparatus 100 may be determined by the opening or closing switching of the blocking unit 130.

The control unit 140 receives load amount information of the transformer 200 linked to a distribution line. When a load amount corresponding to the load amount information is higher than a standard load amount, the control unit 140 controls the blocking unit 130 by electrically opening a path between the first and second ports 110 and 120. Accordingly, the lifespan of the transformer 200 linked to the distribution line may be extended, and the frequency of damage of the transformer may decrease, while the power supplied to the EV-charging apparatus 100 from the transformer may be stabilized.

The communication unit 150 receives load amount information from an intelligent distribution box or a data processing device processing data of the transformer 200 linked to the distribution line. When a load amount corresponding to the load amount information is larger than a standard load amount, the communication unit 150 can create "do not charge" information and deliver the information to a server. Accordingly, an administrator can integrally manage several EV-charging apparatuses.

The input unit 160 may be input with information requesting a charge from the EV 300 or a driver. The charge-requesting information may include information of a charging method, charging mode and/or charging capacity. The charging manner information may include information of power voltage, frequency, DC/AC, wired/wireless and/or charging speed. The chare mode information may include a quick mode, a medium-speed mode and a slow mode. The charge-requesting information may be delivered to the control unit 140. The control unit 140 may then control a time point of switching of the blocking unit 130 based on the charge-requesting information, and can determine power voltage, frequency, DC/AC, wired/wireless and/or a charging speed. The control unit 140 may further generate fee information.

The output unit 170 may output charging status information of the EV 300 and the fee information as well as the information input by the input unit 160 for input convenience of the driver.

Further, the output unit 170 may output the "do not charge" information created by the control unit 140 when a load amount corresponding to the load amount information is higher than a standard load amount.

Meanwhile, the output unit 170, together with the input unit 160, may be implemented as a human-machine interface such as a touch screen and a keypad.

Figure 6:
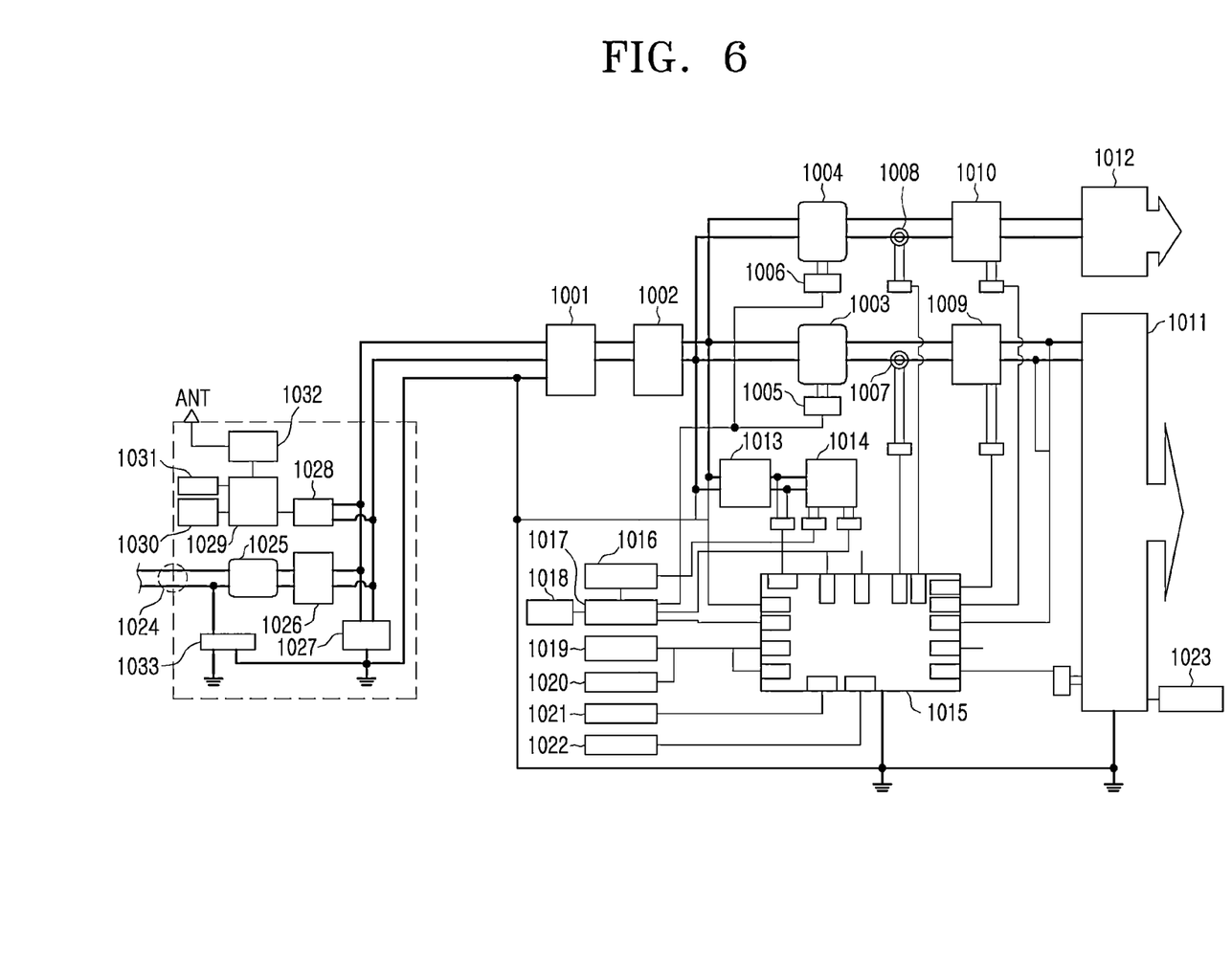
FIG. 6 is a block diagram specifically illustrating the EV-charging apparatus installed on the utility pole according to an exemplary embodiment.

FIG. 6 is a block diagram specifically illustrating the EV-charging apparatus installed on the utility pole according to an exemplary embodiment.

Referring to FIG. 6, the EV-charging apparatus may include at least some of a charger AC terminal 1001, an electric leakage breaker 1002, a first electricity meter 1003, a second electricity meter 1004, a first electricity meter communication terminal box 1005, a second electricity meter communication terminal box 1006, a first current sensor 1007, a second current sensor 1008, a first magnet contactor 1009, a second magnet contactor 1010, a charging connector 1011, a charging outlet 1012, a noise filter 1013, a power supplying device 1014, a controller 1015, a card reader 1016, a display unit 1017, a speaker 1018, a lighting device 1019, an emergency switch 1020, a door solenoid 1021, a plug sensor 1022 and a retractor 1023.

The charger AC terminal 1001 may electrically connect the EV-charging apparatus and the intelligent distribution box, and may correspond to the second port illustrated in FIG. 5.

The electric leakage breaker 1002 can discontinue charging when there is an electric leakage in the EV-charging apparatus, and may correspond to the blocking unit illustrated in FIG. 5.

The first electricity meter 1003 may measure an amount of the charging power during charging in a first mode. For example, the first mode may be a slow mode.

The second electricity meter 1004 may measure an amount of the charging power during charging in a first mode. For example, the first mode may be a quick mode.

The measurements of the first and second electricity meters 1003 and 1004 may be utilized in the creation of the fee information.

The first electricity meter communication terminal box 1005 may deliver the measurement of the first electricity meter 1003 to the controller 1015 or outside.

The second electricity meter communication terminal box 1006 may deliver the measurement of the second electricity meter 1004 to the controller 1015 or outside.

The first current sensor 1007 may measure current of the power supplied to the EV in the first mode.

The second current sensor 1008 may measure current of the power supplied to the EV in the second mode.

The current measured by the first and second current sensors 1007 and 1008 may be utilized in the breakage control of the electric leakage breaker 1002 by the controller 1015.

The first magnet contactor 1009 may control a charging amount in the first mode through on/off switching.

The second magnet contactor 1010 may control a charging amount in the second mode through on/off switching.

The charging connector 1011 may have a structure in which the charging connector 1011 is electrically connected to the EV for the first mode charging, and may correspond to the first port illustrated in FIG. 5.

The charging outlet 1012 may have a structure in which the charging connector 1012 is electrically connected to the EV for the second mode charging, and may correspond to the first port illustrated in FIG. 5.

The noise filter 1013 may filter noise of the charging power.

The power supplying device 1014 may supply operating power to the controller 1015, and may convert AC power to DC power. For example, the power supplying device 1014 may be implemented as a switch mode power supply (SMPS).

The controller 1015 may operate in the same manner as the control unit illustrated in FIG. 5.

The card reader 1016 may be input with payment information from the EV or the driver. For example, the payment information may correspond to at least one of various payment methods such as a credit card, a debit card, mobile payment, and the like.

The display unit 1017 may visually display the information output by the output unit illustrated in FIG. 5.

The speaker 1018 may acoustically create the information output by the output unit illustrated in FIG. 5.

The lighting device 1019 may output a light source toward a charging connector 1011 and a charging outlet 1012.

The emergency switch 1020 may discontinue charging in accordance with an input from the EV or the driver.

The door solenoid 1021 may perform a lock feature of a storage box of the charging connector 1011.

The plug sensor 1022 may observe whether the charging connector 1011 is located in a pre-determined position.

The retractor 1023 may wind a charging cable connected to the charging connector 1011 on a reel. Accordingly, the charging cable may be prevented from being dragged to the floor and damaged.

Referring to FIG. 6, the intelligent distribution box may include at least some of a distribution panel AC terminal 1024, a third power meter 1025, an AC input breaker 1026, a surge protector 1027, a distribution panel power supply device 1028, a distribution panel control board 1029, an image processing device 1030, a sign controller 1031, a wireless modem 1032 and an earth ground 1033. As the intelligent distribution box may be integrated with the EV-charging apparatus, a configuration included in the intelligent distribution box may be included in the EV-charging apparatus.

The distribution panel AC terminal 1024 may electrically connect the intelligent distribution box and a distribution line.

The third power meter 1025 may measure power passing through the intelligent distribution box.

The AC input breaker 1026 may cut off power supplied to the EV-charging apparatus from the intelligent distribution box.

The surge protector 1027 may protect power from a surge.

The distribution panel power supply device 1028 may supply operation power of the distribution panel control board 1029 and convert AC power into DC power. For example, the distribution panel power supply device 1028 may be implemented as a switching mode power supply (SMPS).

The distribution panel control board 1029 may control overall operation of the intelligent distribution box.

The image processing device 1030 may control the visual device of FIG. 1.

The sign controller 1031 may control the charging station sign of FIG. 1.

The wireless modem 1032 may operate in the same manner as the communication unit of FIG. 5.

The earth ground 1033 may supply ground voltage to the intelligent distribution box.

FIGS. 7A to 7D are diagrams exemplifying the structure of intelligent distribution box illustrated in FIGS. 1 and 6.

Figure 7A:
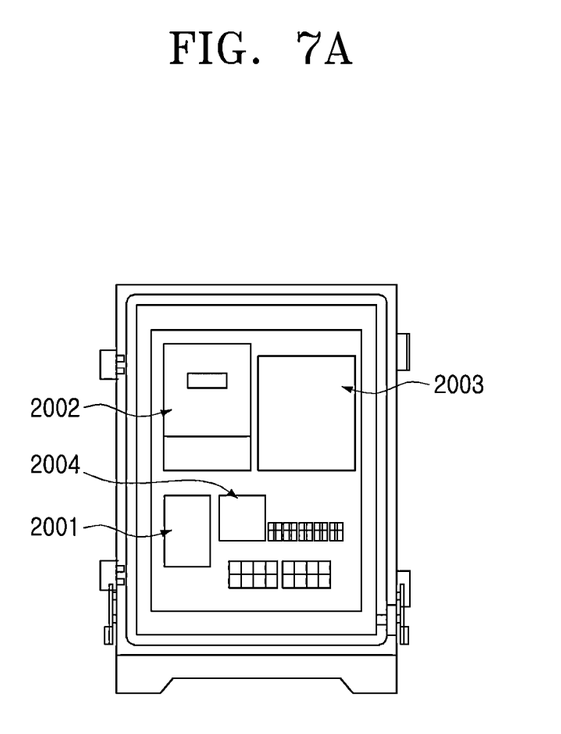
FIGS. 7A to 7D exemplify the structure of an intelligent distribution box illustrated in FIGS. 1 and 6.
Figure 7B:
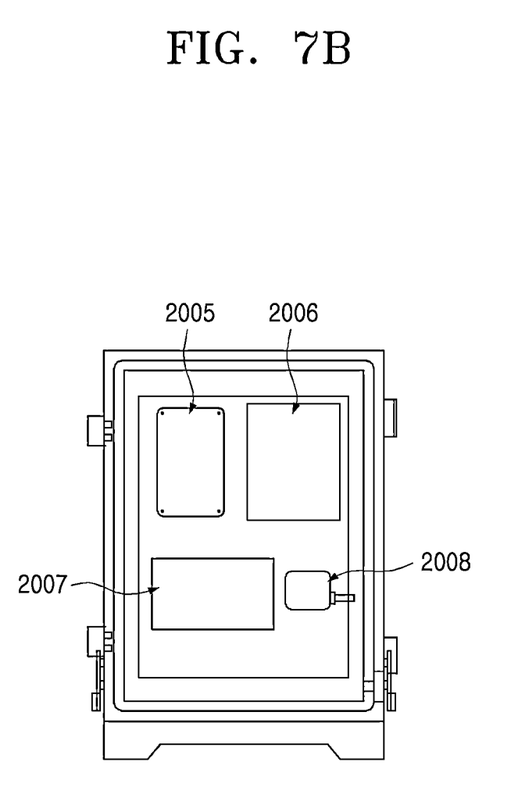
Figure 7C:
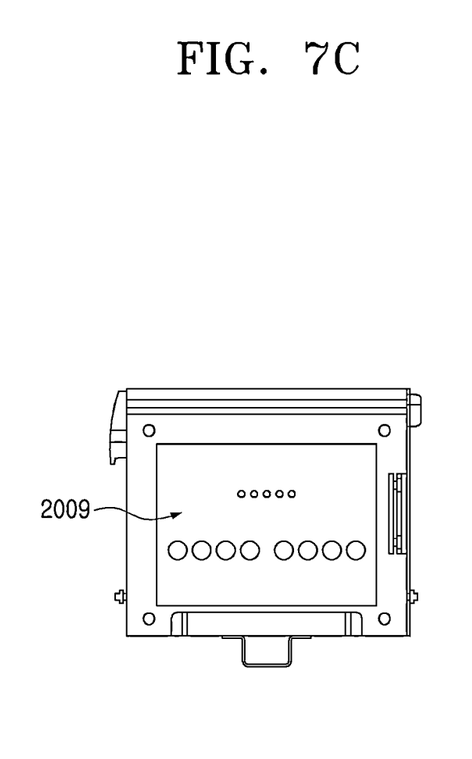
Figure 7D:
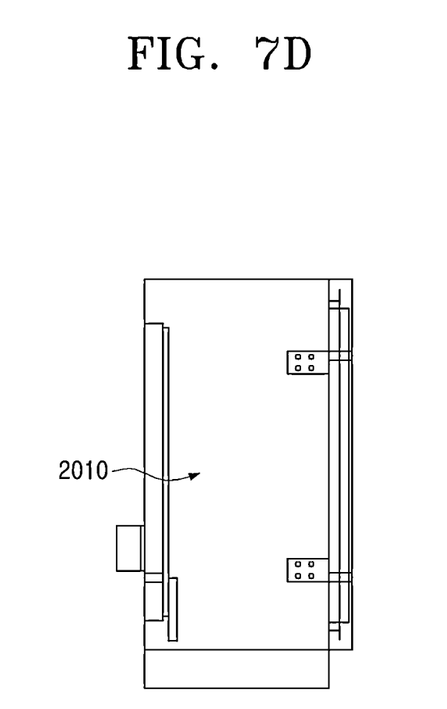

FIG. 7A illustrates a front side of the intelligent distribution box and FIG. 7B illustrates a rear side of the intelligent distribution box, while FIG. 7C illustrates a side of the intelligent distribution box and FIG. 7D illustrates a bottom side of the intelligent distribution box.

Referring to FIGS. 7A to 7D, the intelligent distribution box may include at least some of a wiring switch 2001, a power meter 2002, a surge protector 2003, a power supply device 2004, a controller 2005, an image processing device 2006, a wireless modem 2007, an E-type modem 2008, a distribution panel AC terminal 2009 and an enclosure 2010.

The enclosure 2010 may have a structure in which the enclosure 2010 is attached to or from the utility pole, and may receive a breaker.

Meanwhile, as the intelligent distribution box may be integrated with the EV-charging apparatus according to an exemplary embodiment of the present disclosure, the configurations illustrated in FIGS. 7A to 7D may be included also in the EV-charging apparatus.

Meanwhile, as used herein, the term "unit" refers to a hardware component such as a field-programmable gate array (FPGA) or an application specific integrated circuit (ASIC). The "unit" has a certain function, but is not limited to software or hardware. The "unit" may be configured to be in an addressable storage medium or to play one or more processors. Accordingly, as an example, the "unit" includes components such as software components, object-oriented software components, class components and task components, processes, functions, properties, procedures, subroutines, segments of a program code, drivers, firmware, microcode, circuits, data, databases, data structures, tables, arrays, and variables. The functions provided within the components and the "unit" may be combined into a smaller number of components and "unit", or further separated into additional components and "units." In addition, the components and the "units" may be implemented to reproduce one or more CPUs in a device or system.

The invention claimed is:

1. An electric vehicle (EV)-charging system, comprising
a transformer connected to a distribution line;
a converter converting power converted by the transformer into a charging power; and
a charging apparatus separated from the converter and installed on a first utility pole to receive the charging power from the converter and supply the charging power to the electric vehicle,
a first port configured to provide charging power to the EV;
a second port configured to provide the charging power converted by the converter;
a blocking unit configured to switch a path between the first port and the second port;
a control unit configured to receive a load amount information of the transformer linked to the distribution line and if the load amount information is higher than a standard load amount control the blocking unit by electrically opening the path between the first port and second port, wherein the converter includes a first converter which converts power transformed by the transformer into slow charging power and supplies the slow charging power to the EV-charging system and a second converter converts power transformed by the transformer into quick charging power and supplies the quick charging power to the EV-charging system, wherein the converter is installed on a second utility pole, wherein the first utility pole is connected to the distribution line.

2. The system of claim 1, wherein the converter is installed in a position higher than a position in which the charging apparatus is installed on the utility pole or a second utility pole.

3. The system of claim 1, wherein the transformer is installed on the second utility pole.

4. The system of claim 1, further comprising an underground cable for electrically connecting the converter and the charging apparatus through underground.

\* \* \* \* \*